US006235403B1

(12) United States Patent
Vinden et al.

(10) Patent No.: US 6,235,403 B1
(45) **Date of Patent: *May 22, 2001**

(54) PROCESS OF TREATING WOOD WITH PRESERVATIVE

(75) Inventors: Peter Vinden; Peter R. S. Cobham; Francisco J. Romero, all of Victoria (AU)

(73) Assignees: The University of Melbourne; Chemica Limited, both of (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/952,132

(22) PCT Filed: May 8, 1996

(86) PCT No.: PCT/AU96/00278

§ 371 Date: May 5, 1998

§ 102(e) Date: May 5, 1998

(87) PCT Pub. No.: WO96/35560

PCT Pub. Date: Nov. 14, 1996

(30) Foreign Application Priority Data

May 8, 1995 (AU) .................................................. PN 2865
May 24, 1995 (AU) .................................................. PN 3133

(51) Int. Cl.[7] ................................ B05D 1/18; B05D 1/38; B05D 3/02; B32B 21/04

(52) U.S. Cl. ........................ 428/537.1; 427/297; 427/298; 427/317; 427/325; 427/351; 427/393; 427/397; 427/440; 427/441

(58) Field of Search ..................................... 427/297, 298, 427/317, 325, 351, 393, 397, 440, 441; 428/537.1

(56) References Cited

U.S. PATENT DOCUMENTS 1,523,925 1/1925 Wheaton .
2,329,774 * 9/1943 Lefkof .

(List continued on next page.)

FOREIGN PATENT DOCUMENTS

36574/78 * 5/1978 (AU) .
36574/78 A1 12/1979 (AU) .

(List continued on next page.)

OTHER PUBLICATIONS

Blew et al., "Vacuum Treatment of Lumber," Forest Products Journal, 20(2):40–47 (Feb. 1970), Presented at: 23rd Annual Meeting of the Forest Products Research Society (Jul. 7, 1969), San Francisco, California.

(List continued on next page.)

*Primary Examiner*—Katherine A. Bareford
*Assistant Examiner*—Michael Barr
(74) *Attorney, Agent, or Firm*—Flehr Hohbach Test Albritton & Herbert LLP

(57) ABSTRACT

A wood treatment process is disclosed in which in one aspect the wood is impregnated with a waterborne preservative such as CCA at elevated temperature and pressure. The impregnated wood and excess waterborne preservative are separated while the treatment vessel (8) is pressurized, for example by blowing the preservative out of the vessel at the treatment pressure using a pump (10). Kickback may be segregated from the wood once pressure is reduced after the separation of wood and preservative. In another aspect the wood is impregnated with a waterborne preservative and with oil, each of the impregnating steps being performed under pressure and the oil being heated. If the preservative is one such as CCA which is capable of being fixed to the wood the hot oil may enhance this as well as providing water repellency. The oil may be a process oil.

42 Claims, 10 Drawing Sheets

U.S. PATENT DOCUMENTS

| | | | | |
|---|---|---|---|---|
| 3,874,908 | | 4/1975 | Liddell . | |
| 3,964,863 | | 6/1976 | Carr . | |
| 4,466,998 | * | 8/1984 | McIntyre et al. | 427/297 |
| 4,649,065 | * | 3/1987 | Hein et al. | 427/370 |
| 4,927,672 | * | 5/1990 | Drinkard, Jr. | 427/336 |

FOREIGN PATENT DOCUMENTS

| | | | |
|---|---|---|---|
| 2061638 | | 8/1993 | (CA) . |
| 41 12 643 A1 | | 10/1992 | (DE) . |
| 0 209 293 A1 | | 1/1987 | (EP) . |
| 560738 | * | 9/1993 | (EP) . |
| 0 560 738 A1 | | 9/1993 | (EP) . |
| 926645 | | 5/1963 | (GB) . |
| 990834 | | 5/1965 | (GB) . |
| 1181246 | | 2/1970 | (GB) . |
| 2071715 | | 9/1981 | (GB) . |
| 483244 | | 12/1975 | (SU) . |
| 92/19429 | | 11/1992 | (WO) . |
| 92/19429 | * | 11/1993 | (WO) . |

OTHER PUBLICATIONS

Pizzi, A., "A New Approach to the Formulation and Application of CCA Preservatives," Wood Sci. Technol.17:303–319 (1983).

* cited by examiner

PROCESS OF TREATING WOOD WITH PRESERVATIVE

TECHNICAL FIELD

The present invention relates generally to processes for treating wood with preservatives and optionally other additives. In particular, in one aspect the present invention relates to a process for improving the fixation of waterborne preservatives in wood. In another aspect, the invention particularly concerns a wood preservation process which enhances the water repellency of the wood and may facilitate fixation of the wood preservative.

BACKGROUND ART

Existing processes used for treating wood with preservatives include the Bethell, Lowry, Reuping and MSU processes.

The Bethell process involves using an initial vacuum to remove air from the wood cells and then flooding with preservative solution a cylinder loaded with the wood under vacuum. Positive pressure of about 1400 kPa is then applied for a predetermined time, the preservative solution is drained and a final vacuum is drawn. All pressures referred to herein are gauge.

In the Lowry process, no initial vacuum is applied and the cylinder is flooded under atmospheric pressure. Positive pressure of about 1400 kPa is then applied for a predetermined period, the cylinder is then drained and a final vacuum drawn. The preservative net uptake is lower because the air is not removed from the wood cells but is compressed during treatment, thus resulting in kickback of preservative when pressure is released and the timber evacuated.

The Reuping process involves applying an initial air pressure of about 350 kPa to the wood in the cylinder and then flooding the cylinder holding this initial air pressure. Increased pressure of about 1000 kPa is then applied and, after a predetermined time, the pressure is released and the cylinder drained. A final vacuum is then drawn. This process has a lower net uptake than both the Bethell and Lowry processes.

The MSU process is a modification of the Reuping process. The Reuping process is carried out but the cylinder is drained maintaining a pressure of about 300 kPa. Heat is then applied by steaming the wood to fix the preservative. After the fixation period, kickback is allowed to occur by reducing the pressure and a final vacuum is drawn.

Pulsation or processes which cycle pressure have also been used to improve the treatment of relatively impermeable wood. Specialised treatment schedules have been developed involving oscillating, alternating or pulsation pressures to improve penetration and hence treatment of impermeable wood. Some of these processes involve higher pressures than is used in the aforementioned conventional treatment plants.

These processes involve rapid changes in pressure and it is believed that this causes a greater pressure difference through obstacles within the wood, while the total pressure within the wood increases slowly allowing the preservative to enter small pores. Care must be taken using very high pressure treatments as the wood cells are likely to collapse.

The oscillating pressure method (hereinafter referred to as "OPM") is suitable for treating wood species such as spruce which are difficult to treat once dry. The process is carried out with an oscillating change of pressure between vacuum and pressure. The pressure range is −93 kPa to 600–1500 kPa. During the pressure phases of the process, preservative solution is forced into the wood where it mixes with the wood sap. During the vacuum cycles, air entrapped in the wood expands, forcing a mixture of wood-sap preservative and air out of the wood. As the cycles continue their is a gradual replacement of wood sap in the wood with preservative solution.

The wood to be treated by the OPM must usually be sap fresh (green), meaning the moisture content must be above fibre saturation in all parts of the sapwood. Air must be present to expand during the vacuum phase and escape from the wood so that the sap can be sucked out of the wood and the impregnating solution pressed into it.

The OPM can be carried out on easy to treat species, such as pine in semi-dry or fully dry condition. The time to treat air dry poles by the OPM is two to four hours compared to 14 to 18 hours for sapfresh pine poles. For dry wood, the OPM gives approximately the same results as the Bethell process. Considerably improved impregnation is obtained on unseasoned wood.

In New Zealand, the OPM has been successfully used to treat pine species after steam conditioning. It had been found that freshly cut pine was too saturated to be treated green by the OPM.

The OPM process was modified in New Zealand to exclude the vacuum phase. The resultant process, known as the Alternating Pressure Method (hereinafter referred to as "APM"), involves a number of cycles at pressure from 0–1400 kPa. This is equivalent to a series of Lowry empty cell treatments.

The APM is possible because of the action of steam preconditioning. Species used in New Zealand with the APM are *P. radiata* and *P. nigra.*

Initial APM schedules required one hour cycling for about every 2.5 cm of sapwood depth. Later research showed that 15 cycles were sufficient for complete sapwood penetration. The heartwood of sawn timber is treated partially by cycling and further by maintaining the final cycle on pressure for an extended time. The cylinder is flooded without an initial vacuum and then the APM cycles are 1 to 2 minutes on pressure at 1400 kPa and 1 minute off pressure.

The pulsation process is a further modification of the OPM. It was developed to increase the penetration in refractory species like white spruce. Pulsation trials using both creosote and water-borne CCA (copper-chrome-arsenic preservative) have been conducted with white spruce roundwood and sawn timber.

The pulsation process alternates between high and low pressures of 300 kPa to 2100 kPa. 2100 kPa is well above the normal pressures used for treating wood. The aim of pulsation is to treat refractory species. These species may also be prone to collapse.

Pulsation is based on the Reuping process with a sequence generally as follows:

(a) Initial air pressure of 350 kPa.

(b) Cycling between 350 kPa and 2100 kPa. Some of the schedules involve increasing the pressure to 2100 kPa over several cycles i.e. first to 1000 kPa, second to 1200 etc. up to 2100. This slow rise is to minimise collapse caused by the high pressure.

(c) The cylinder is then drained and a final vacuum drawn.

Total treatment time varies between 7 and 20 hours depending on the number and duration of the cycles. Improvement in the treatment of refractory spruce has been achieved.

The Fast process was developed in New Zealand to increase productivity in treatment plants. The process involves the use of 5 cycles of pressure from 0 to 1400 kPa, i.e. a short APM. However, instead of using steam preconditioned timber, air dried or kiln dried timber is treated.

Less time is taken in treating the timber because there is no initial vacuum. The process was validated by carrying out trials with matched samples treated by a Bethell process. It was found that there was no significant difference in penetration or retention between the Fast and Bethell processes. The fast process is now used by a number of plants in New Zealand.

The aforementioned existing processes for the fixation of waterborne preservative such as CCA to wood involve two distinct steps. The first step involves treatment of the wood with the preservative at about ambient temperature and then removal of the treatment solution.

The second step involves fixation by heating the treated wood at moderate or high temperatures or at low temperatures for a long period of time. For example, in the MSU Process the treated wood is subjected to hot water and steam at about 95° C. to accelerate fixation of the preservatives.

A problem with the aforementioned existing processes is that the two step operation necessitates the use of a complex plant operation, the treatment and fixation time is prolonged, and there is a risk that not all of the preservative is fixed to the wood which can cause leaching of harmful preservatives to the environment.

There is considerable pressure on the wood preservation industry to ensure that all treatment plants meet environmental standards. In most cases this will mean the introduction of a fixation step which may be as simple as drip pads to hold the timber at ambient temperature until fixation or a separate fixation process.

One potential method of reducing the fixation time of waterborne preservative to wood is to treat the wood with the preservative at elevated temperature. For example, A. Pizzi in "A New Approach to the Formulation and Application of CCA Preservatives", Wood Sci. Technol. 17 (1983) at 304–307 confirms that an increase in treating temperature increases the rate of fixation. However, treatment of wood with waterborne preservatives at above-ambient temperatures has not been practised except in countries with very cold winters when the solution may be warmed to about 20° C. In some cases, such as CCA, this is because it has long been believed that the waterborne preservative is unstable at elevated temperature.

We have found that CCA is in fact stable at elevated temperatures unless the solution is contaminated with a reactant which converts the hexavalent chrome to trivalent chrome and causes precipitation and consequent sludging of the solution. Such reactants include the wood sugars which appear in kickback from the treated wood when pressure is removed.

We have now found in a first aspect of the invention that applying heated waterborne preservatives such as CCA to wood can achieve rapid fixation which alleviates the cost and environmental problems associated with the existing processes and that kickback contamination can be alleviated.

Creosote is a heavy oil of tar which has been widely used as a wood preservative which imparts water repellency and dimensional stability to wood. Creosote contains a vast array of organic chemicals some of which are very toxic. The environmental risks involved in using creosote are now being recognised. Furthermore, creosote is costly and difficult to manage on a commercial scale.

The treatment of wood with zinc chloride and creosote is known. However, this two stage treatment lost favour due to the high costs involved in using creosote.

The use of two stage treatments where the wood is allowed to dry between treatment with a waterborne preservative and creosote have also been investigated. However, such treatments were found to be too costly and time consuming.

Water repellent copper-chrome-arsenic (hereinafter referred to as "CCA") emulsions have also been produced. This has been achieved by the addition of water repellents, such as, waxes and resins to the CCA. Emulsions of CCA and oil have also been developed. Both the CCA/water repellent and CCA/oil emulsions have limitations due to the high costs involved in producing them and the need to store them in special tanks. In some instances, the emulsions have also been found to break down.

A requirement accordingly exists in a second aspect of the invention for a wood preservative process which enhances the water repellency of the wood, but which avoids or at least alleviates the environmental and cost problems described above.

SUMMARY OF THE INVENTION

According to the first aspect of the present invention there is provided a process for treating wood with waterborne preservative which comprises the steps of:

- introducing wood to be treated into a treatment vessel;
- optionally applying an initial vacuum or pressure to the wood, the pressure if applied being less than 150 kPa;
- immersing the wood in the vessel in a waterborne preservative and treating the wood by impregnating the wood with the preservative, the treatment being conducted at elevated temperature of from greater than 30° C. to less than 100° C. so as to facilitate fixation of the preservative in the wood, and at elevated pressure in the treatment vessel to facilitate impregnation of the wood by the preservative;
- separating the impregnated wood and the excess waterborne preservative while the treatment vessel is pressurized; and
- reducing the pressure in the treatment vessel.

Further according to the present invention there is provided wood when treated by the process described in the immediately preceding paragraph.

By the first aspect of the invention, improved fixation is achieved by the use of elevated temperatures during the impregnation and the risk of contaminating the solution with kickback, with the possible breakdown of the preservative, is alleviated by separating the residual preservative and the impregnated wood while the vessel is pressurized and therefore before there is likely to be any kickback. The fixation is achieved in a one-step process, that is without a separate fixation step.

According to an advantageous feature of the first aspect of the invention any kickback is segregated after the separating and reducing steps.

The waterborne preservative may be any preservative which becomes insolubilised or fixed in the wood as a result of interaction with wood, particularly where these reactions are accelerated at elevated temperatures. Such preservatives include chromium and/or arsenic containing preservatives, for example, CCA or oxides or salts thereof, acid copper chromate or chromated zinc chloride; amnnoniacal preservatives, for example, ammoniacal copper arsenate, ammoniacal copper zinc arsenate, ammoniacal copper carboxylates, ammoniacal copper dithiocarbamates or ammoniacal copper citrate; boron compounds, for example disodiumoctaborate tetrahydrate or zinc borates; alkylammonium compounds of "quats", for example, ammoniacal copper quats; or mixtures of any of the above. Advantageously, the preservatives are provided in the form of an aqueous solution.

The wood may also be treated with other additives either before, after or simultaneously with the heated preservatives. These other additives may include water repellents, such as, waxes, resins or polymers, for example, polyethylene glycol; fire retardants, such as phosphates; mildewicides; insecticides; mouldicides; dyes or pigments.

The wood may be any timber or wood based product, such as refractory timber, softwoods or hardwoods. The softwood may include pine species such as *P. radiata* and spruce species, for example, heartwood or sapwood. Heartwood is the most difficult part of *P. radiata* to treat with preservatives. The hardwoods may include eucalypts.

The preservative may be heated, for example to a temperature in the range of above 30° C. to boiling, preferably above 30° C. to about 90° C., most preferably about 40° C., to provide the elevated treatment temperature. Alternatively, or in addition, the wood may be preheated, for example by drying such as in a kiln or by steaming. Preheating the wood will tend to heat up a cold or cooler waterborne preservative and improves the permeability of the wood.

Preheating the wood by steam conditioning may improve the permability of the wood, particularly heartwood of, for example, radiata pine. The improved permability is believed to arise from a redistribution of resin in the wood which may block penetration pathways for the preservative, and it is possible there is also some structural modification to the wood, i.e. soft radial tissue may be partially broken down. Steaming is preferably applied to dry timber. Dry timber is usually a poor conductor of heat, but it has been found that if the timber is evacuated prior to steaming there may be a very rapid penetration of steam into the wood and subsequent condensation and heating of timber. Pre-evacuation of the wood may be to, for example, −85 kPa. Pre-evacuation and steaming are advantageously conducted in the treatment vessel, which permits the treatment of the heated wood with the waterborne preservative to be initiated directly. The evacuation and application of steam may take place over a period of from about 10 to 80 minutes. Steaming is preferably conducted with superheated steam, for example under pressure at 127° C. The temperature of the wood will generally be below 100° C. at the time of treatment. Sludge formation may occur due to contamination of the preservative with water soluble wood extractives, such as, water soluble wood sugars, as previously described. Sludge can also occur if care is not taken with the quality of the feed water. The presence of iron or chlorides in the feed water may promote sludge formation. Contaminants present on the wood such as sand or soil can also be responsible for the formation of sludge.

To minimise sludge formation, the process may include the step of detecting organics in the waterborne preservative. Any detected organics could then be removed by a suitable in-line technique, such as, for example, extraction, reverse osmosis, ion-exchange, centrifugation or the addition of peroxide or chromic acid.

Long treatment times will tend to result in diffusion of wood-based sugars from the wood. If this occurs while the wood is in contact with the waterborne preservative sludging may occur. Therefore it is advantageous for the contact time to be minimized to avoid diffusion while the wood is in contact with the preservative. This preferred maximum contact time will vary with many parameters of the process and wood but may be readily ascertained on a case-by-case basis by experimentation. However, the preferred maximum contact time may be calculated by the time taken to provide a gross uptake of preservative of 450 $l/m^3$. This figure is for sapwood, and heartwood will invariably have less uptake for the same process parameters. Likewise mixtures of heartwood and sapwood will have corresponding intermediate volumes of uptake.

The process of the first aspect of the invention can be performed using any suitable pressure schedule, including appropriately modified forms of the aforementioned standard Bethell, Lowry and Reuping processes. The use of low pressure may be preferred since kickback after pressure reduction may be reduced. A final vacuum, for example to −85 kPa or more, is desirable to assist drying of the wood and controlled kickback. Any kickback may be segregated and processed or discarded. The final vacuum may be held for a period of, for example, 15 to 45 minutes.

Separation of the impregnated wood and the excess waterborne preservative while the treatment vessel is pressurized is more important for "empty cell" processes such as Lowry, Reuping and modified Bethell schedules because of the much higher kickback of solution experienced with these processes.

The maximum pressure at which the process is performed will vary, for example depending on the type of wood to be treated and the process, but is typically up to about 1400 kPa. For heartwood, the pressure is advantageously up to about 700 kPa. The pressure may also be cycled between high and low, for example as previously described so that internal pressures are substantially equalised. The pressure treatment may be applied for an appropriate time, generally in the range of about 5 to about 180 minutes.

High standards of preservative treatment can be achieved in accordance with the first aspect of the invention at relatively low pressures. The use of such pressures, in the range of 150–700 kPa, is advantageous because the cost of treatment plant can be reduced. The phenomenon of "delayed kickback" (that is the movement of solution from within the wood to the surface of the wood several hours or more after removal from the treatment plant) has also been found to be alleviated at these pressures. Delayed kickback is an important phenomenon to be avoided because it can lead to the leaching of preservative when the timber is exposed to rain wetting.

It has also been found that some wood commodities can be treated with ultra-low pressures. These commodities include predominantly sapwood timber of pine species which may have been conditioned to improve its permeability—for example by high temperature drying or steam pretreatment. For such commodities treatment can be achieved by, for example, the Reuping process with initial air pressures ranging from 0–150 kPa, but advantageously to less than 150 kPa, for example about 35 kPa. Impregnation of preservative can be achieved at any elevated pressure, for example up to 350 kPa for ultra low pressure treatment, preferably about 150 kPa. The advantage of using ultra low pressures arises from the ability to essentially use existing plant for the Reuping treatment while at the same time minimising preservative net retention, for example to approximately 170 $l/m^2$ and maintaining total sapwood impregnation in Radiata pine. The combination of the process of the first aspect of the invention and ultra low pressures can provide treated timber and round wood which is fixed and has low weight and moisture content immediately after treatment. Timber and roundwood can be dried to equilibrium moisture content and machined to final shape and form prior to treatment. In many instances this can obviate the need for redrying of timber prior to use.

The treatment vessel may be pressurized by using any suitable apparatus, such as, for example, a high volume transfer or pressure pump or air pressure provided by a compressor system. An inlet may be provided at one end of the vessel with pressure being relieved from the other end which allows for a high volume flow over and through the wood in the vessel. The wood will generally be fully submerged in the waterborne preservative. The separation of the wood and the excess waterborne preservative may be performed by removing the wood from the preservative.

The vessel may be, for example, a rectangular box or a cylinder. Instead of the aforementioned high volume flow through the vessel, the wood may be lowered into the preservative from within the vessel, or the vessel may be rotated to immerse the wood, for example.

Advantageously, the separation of the impregnated wood and the excess waterborne preservative comprises removing the waterborne preservative from the vessel while the vessel is pressurized. Thus, the excess waterborne preservative may be blown into a storage vessel at the treatment pressure or higher.

After treatment, fixation may if necessary be completed by a short holding period, for example, on a drip pad. The treated wood may also be washed, for example, with water to remove excess preservative or to act as a cold quench.

An advantage of a preferred embodiment of the process of the first aspect of the invention is that the wood is heated by the preservative instead of via heat transfer through wet wood. This may dramatically reduce the time which the wood needs to be in contact with heat to obtain the required fixation level of the preservative. It is also expected that increased penetration of preservatives in the wood, particularly heartwood, may be achieved with heated preservative.

A further advantage of the process of the first aspect of the invention is that the wood can be treated in blockstack, rather than fillet form with fillets placed between many layers of wood. Fillet form is usually provided so that air can flow over the wood to be dried and, in the known fixation processes, fillets are used so that the heated liquid can reach all surfaces to give good heat transfer. Blockstacked wood is packaged in a solid package with only sufficient fillets to give the package stability when being transported. Normally only two or three layers are present in each package. There are benefits in having the wood in blockstack form as follows:

(a) there is more wood in a charge as fillets take up space;

(b) it is less costly than filleting and destacking; and (c) it is easier to handle the package.

If desired to improve the water repellency of the treated wood the wood may be impregnated with oil, before or after the impregnation of the waterborne preservative, preferably after. Advantageously, the oil impregnation is performed under pressure. If the oil is heated it may enhance the fixation of the preservative.

This oil impregnation may advantageously be used independently of the process of the first aspect of the invention and, according to the second aspect of the invention there is provided a process for treating wood with preservative which comprises the steps of:

impregnating the wood with a waterborne preservative using a modified Bethell process; and subsequently impregnating the wood with oil, said oil impregnating step being performed under pressure and said oil being heated.

Further according to the second aspect of the invention there is provided wood when treated by the process described in the immediately preceding paragraph.

The preservative may be a fixed or non-fixed waterborne preservative. Preferably the preservative is fixed waterborne and may be selected from chromium, copper and/or arsenic containing preservatives, for example, CCA or oxides or salts thereof, acid copper chromate, chromated copper borate or chromated zinc chloride; ammoniacal preservatives, for example, ammoniacal copper arsenate, ammoniacal copper zinc arsenate, ammoniacal copper carboxylates, ammoniacal copper dithiocarbamates or ammoniacal copper citrate; boron compounds, for example disodiumoctaborate tetrahydrate or zinc borates; alkylammonium compounds or "quats", for example, ammoniacal copper quats, or mixtures of any of these. Preferably the preservative is provided in an aqueous solution.

The oil may be an organic oil such as creosote or process oils, for example any of the Mobil Prorex (Registered Trade Mark) series of process oils which are solvent-refined paraffinic process oils.

The oil is preferably heated to a temperature in the range of above ambient to about 90° C., preferably about 40° C. to about 80° C., more preferably about 60° C. Creosote may be heated to a higher temperature, for example about 85° C., in view of its greater viscosity.

The period during which the wood is subjected to the oil impregnation treatment will vary with the oil (e.g. viscosity), the timber commodity, and previous treatments such as preconditioning and preservative uptake. However, the oil uptake is desirably from about 25 to about 100 $l/m^3$ or more, preferably from about 30 to about 50 $l/m^3$. Less than about 25 to 30 $l/m^3$ may give less than total oil penetration, while more than about 50 $l/m^3$ may increase costs unnecessarily.

The preservative may be applied at ambient temperature, but advantageously, the preservative is also heated so as to assist its penetration into the wood, as described with reference to the first aspect of the invention.

The wood may also be treated with other additives either before, after or simultaneously with the preservative. These other additives may include water repellents, such as waxes, resins or polymers, for example polyethylene glycol; fire retardants, such as phosphates; mildewicides; insecticides; mouldicides; dyes or pigments. Many of these additives may advantageously be applied with the oil.

The wood may be any timber or wood based product, such as refractory timber, softwood or hardwood. The softwood may include pine species such as *P. radiata* and spruce species, for example, heartwood or sapwood. Heartwood is the most difficult part of *P. Radiata* to treat with preservatives. The hardwoods may include eucalypts.

Pressure may be applied during the preservative impregnation treatment in line with known schedules for modified Bethell processes, and during the oil impregnation treatment by, for example, any of the previously described processes. Thus, in addition to the pressure at each stage and the initial vacuum applied to the wood prior to the preservative impregnation, a vacuum may also be applied between the applications of pressure during the preservative and oil impregnations, and a final vacuum may be applied once oil impregnation is complete. Preferably relatively low pressures are used for the preservative impregnation, for example up to 700 kPa, preferably up to 350 kPa. Somewhat higher pressures may be used for the oil impregnation, for example from 700 to 1000 kPa.

The oil impregnation and preservative impregnation may be performed in the same vessel, but advantageously the impregnations are performed in different vessels. The or each vessel may comprise, for example, a rectangular box or cylinder through which the preservative and/or oil may be arranged to pass. The or each vessel may be arranged to move the wood into and out of the preservative or oil within the vessel. Preferably the wood is wholly immersed in the preservative and separately in the oil.

The pressure may be applied by using any suitable apparatus, such as, for example, a high volume transfer or pressure pump or air pressure provided by a compressor system. An inlet may be provided at one end of the or each treatment vessel with pressure being relieved at the other end, which allows for a high volume flow over and through the wood.

After treatment, fixation may if necessary be completed by a short holding period, for example, on a drip pad. The treated wood may also be washed, for example, with water to remove excess preservative or oil or to act as a cold quench.

The process of the second aspect of the present invention allows for the treatment of wood with preservatives followed by heated oil which penetrates the wood and may facilitate fixation of the preservative or otherwise resist diffusion of the preservative and sugars from the wood. The complete penetration by the oil means that even if toxic oils, such as creosote are used, there will be little drip or kickback of these oils from the treated wood, which minimises environmental problems.

The impregnation by the oil also enhances the water repellency and dimensional stability of the wood which enables it to be used in many outdoor applications including marine applications, vineyard posts and outdoor decking. Wood treated by the process of the second aspect of the present invention is also less likely to suffer from after burn in bush fires than non-oil treated wood.

BRIEF DESCRIPTION OF THE DRAWINGS

The process of the invention will now be described by way of example only with reference to the accompanying drawing in which.

DETAILED DESCRIPTION OF DRAWINGS

Figure 1:
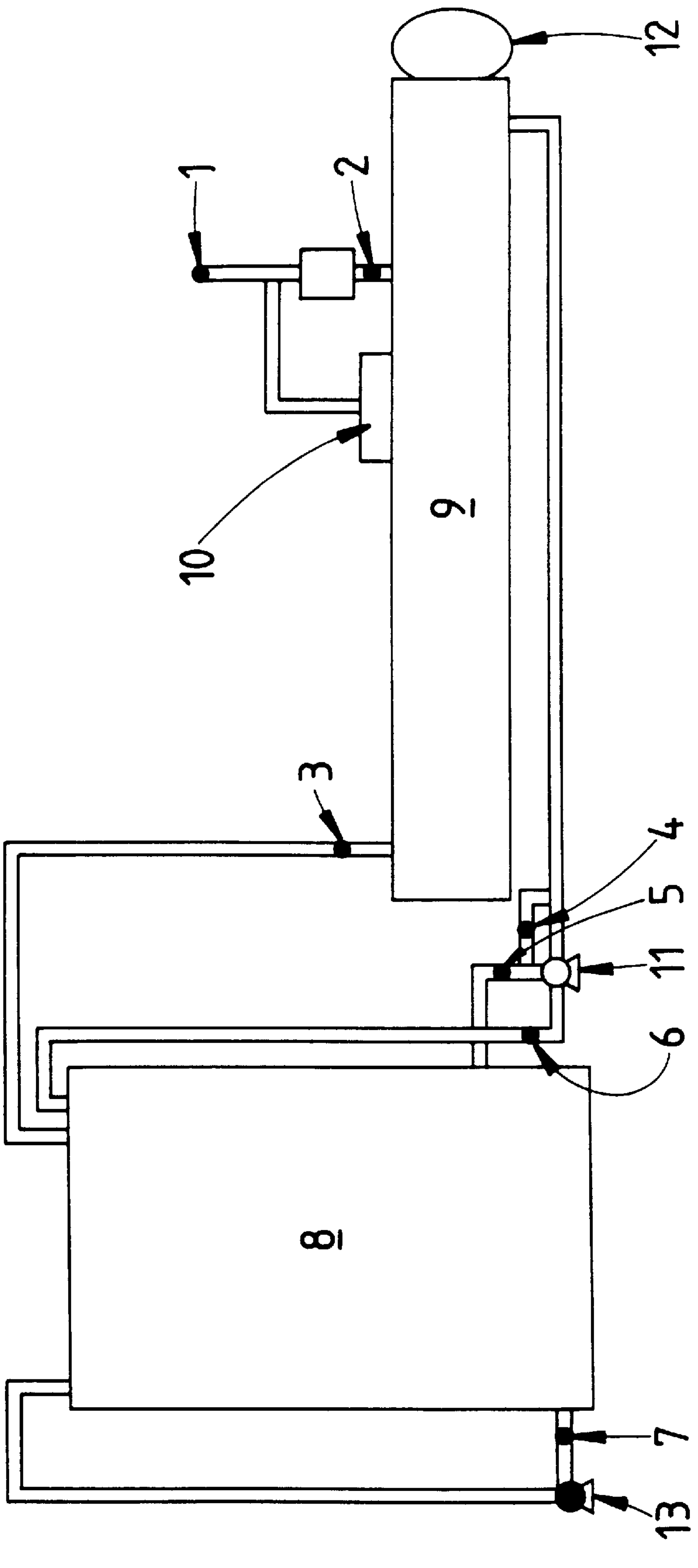
FIG. 1 shows a conceptual design of a plant for operating the process of the invention.
Figure 2:
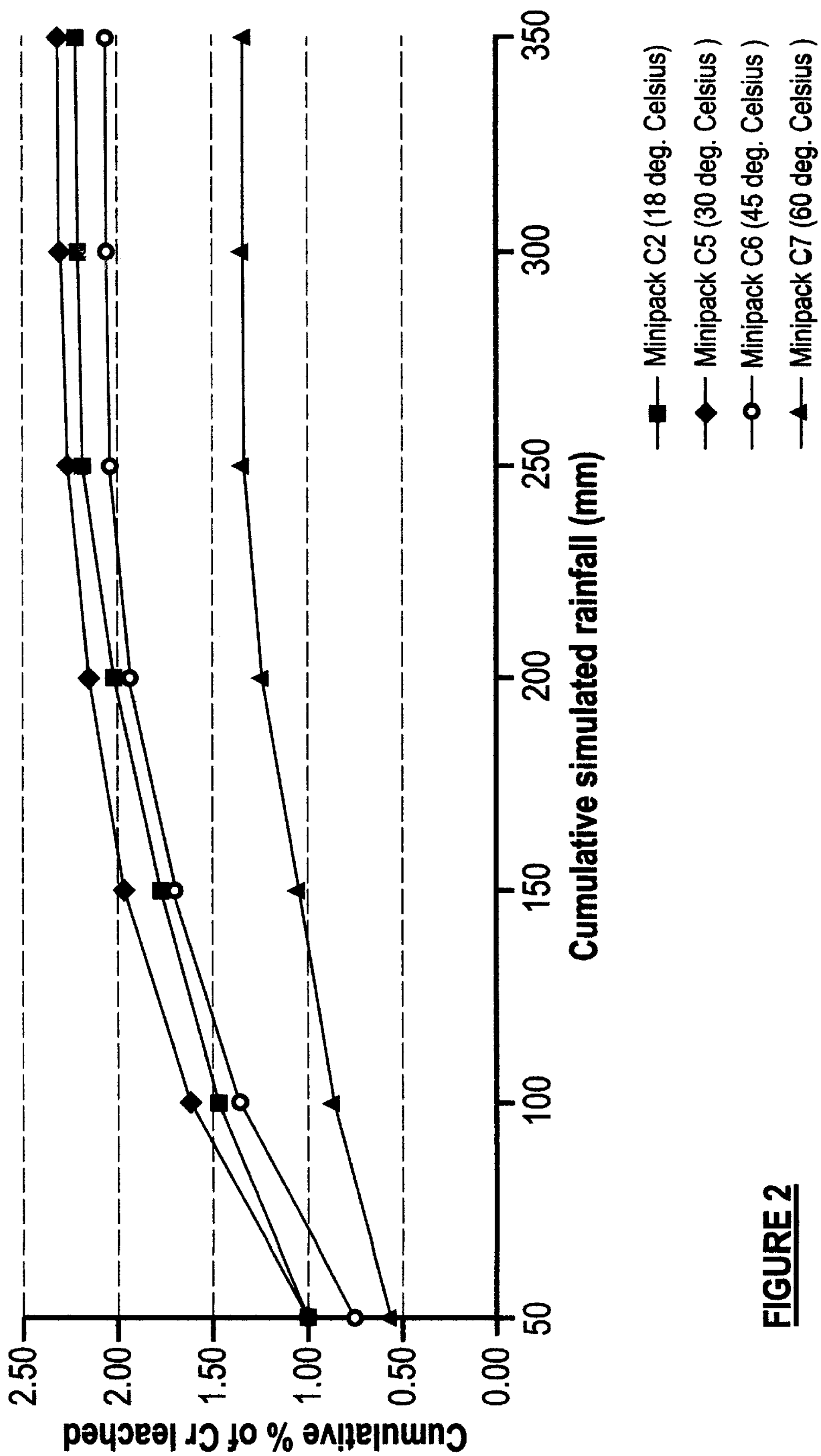
FIG. 2 is a graph showing the effect of temperature on the percentage of Cr leached from heartwood treated by a modified Bethell process.
Figure 3:
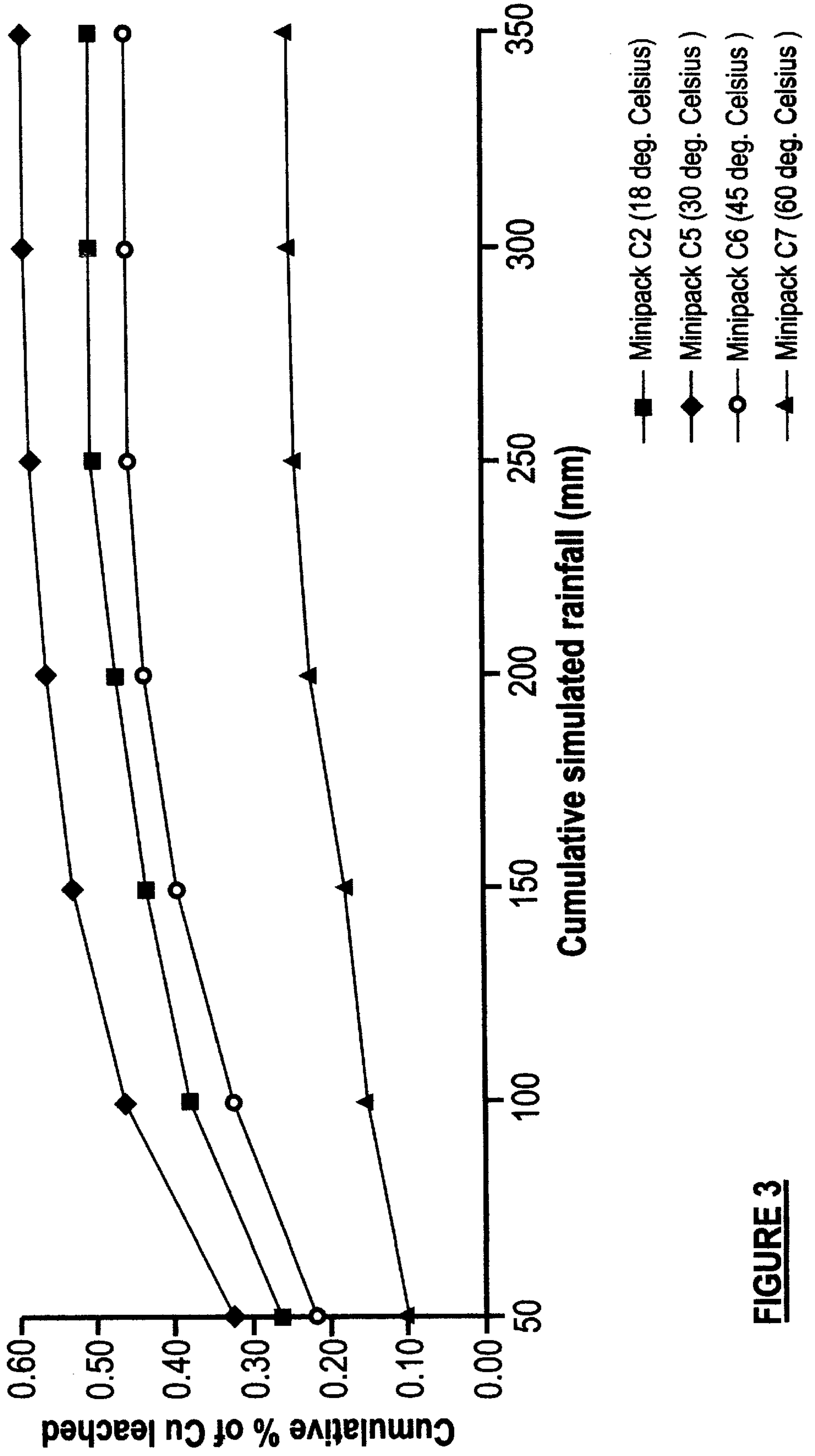
FIG. 3 is a graph showing the effect of temperature on the percentage of Cu leached from heartwood treated by a modified Bethell process.
Figure 4:
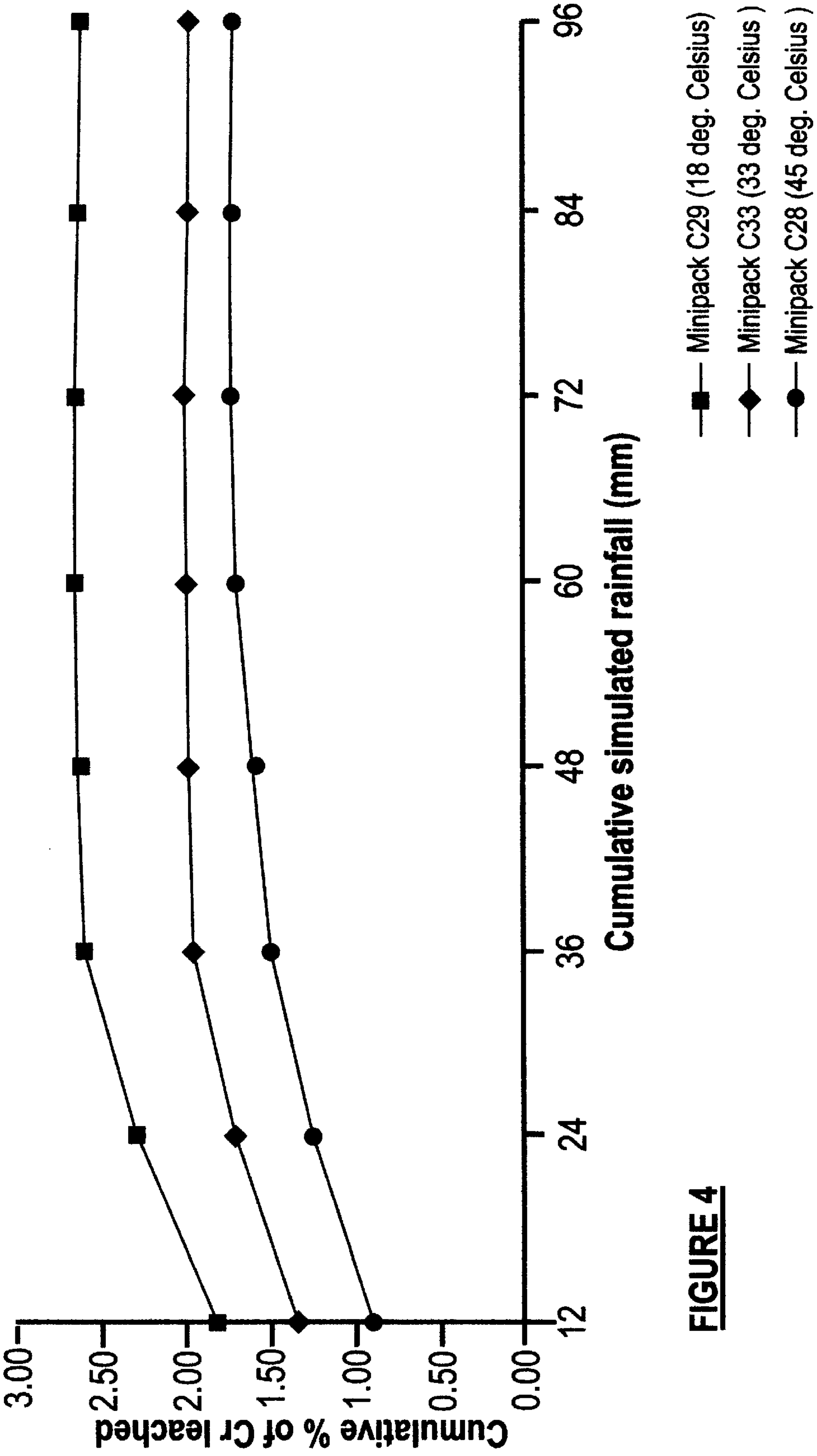
FIG. 4 is a graph showing the effect of temperature on the percentage of Cr leached from heartwood treated by a Lowry process.
Figure 5:
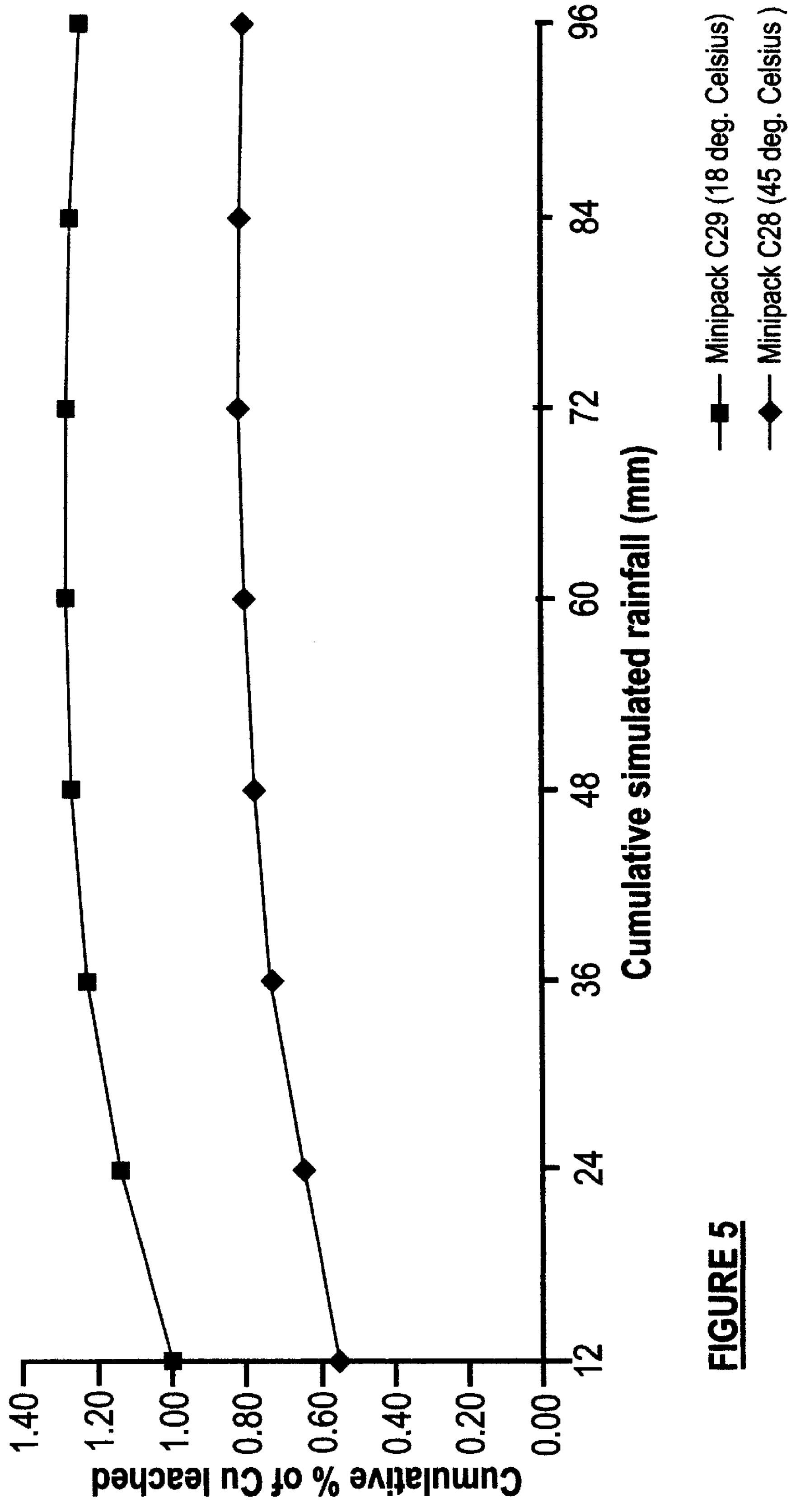
FIG. 5 is a graph showing the effect of temperature on the percentage of Cu leached from heartwood treated by a Lowry process.

Referring to FIG. 1, waterborne preservative is heated to the required temperature, such as 30–98° C. and then agitated with valve 7 open and the agitation pump 13 on. Heating may be achieved either by an in-tank heater or a heat pump in the agitation line. Agitation of the storage tank 8 is continuous.

A pressure cylinder 9 is loaded with wood and the door 12 closed and sealed. In the Bethell or modified Bethell process an initial vacuum, such as, 0 to −98 kPa is drawn with valves 3, 4, 5 and 6 closed and valve 2 open. A vacuum pump 10 is started. A vacuum control valve 1 maintains the required level of vacuum.

The vacuum is reached and held for a predetermined time. The pressure cylinder 9 is then flooded with the hot preservative and valves 5 and 6 are opened. The level of vacuum is maintained by vacuum control valve 1.

Once the cylinder 9 is flooded, valves 2 and 5 are closed. The vacuum pump 10 is then turned off. Alternatively, in the Lowry process the vacuum step may be omitted.

Pressures up to 1400 kPa are applied using a high volume pressure pump 11 with valve 5 open. A pressure control valve 3 maintains the required pressure. The presence of the high volume pump 11 means that there is constantly fresh hot solution passing though the pressure cylinder 9 treating and heating the wood. Pressure is released via the vacuum control valve 1 to ramp down the pressure to 0 kPa.

Once preservative treatment has been completed, there are two alternatives for draining the pressure cylinder 9 as follows:

(a) closing valve 5, opening vales 3, 4 and 6 and using the high volume pressure pump 11 to pump the cylinder dry; or (b) using the vacuum pump 10 as an air compressor so that the liquid can be blown out of the pressure cylinder 9 via line using valve 6 and by-passing the pump.

The advantage of using alternative (b) is that the pressure cylinder 9 can be emptied at the same pressure as the wood was treated or at a higher pressure meaning that any kickback is alleviated until the preservative has been removed from the cylinder and the pressure achieved, and can then be segregated. The kickback can then be collected after final vacuum and cleaned up prior to returning clean preservative to the storage tank 8.

After draining the cylinder, all the valves are closed apart from valve 2 and a vacuum such as −80 to −98 kPa is drawn on the pressure cylinder 9. After a predetermined time, the vacuum is vented through valve 1 and any residual liquid is then cleaned and/or recycled.

The door 12 is then opened and the treated fixed timber removed for storage under cover until it is despatched. A short holding period may be required before the wood leaves the treatment containment area.

In the process of the second aspect of the invention the preservative may be used at ambient temperature or heated as described above. The process described above may be repeated for the oil treatment in the same equiment (with the oil stored in a different storage vessel 8) in which case the cylinder 9 may be flooded with the hot oil while the treated wood is held under vacuum prior to completing the preservative treatment. Alternatively, the preservative treated wood may be transferred to a secondary fixation station which is essentially identical to the apparatus described with reference to FIG. 1 and whose operation may be the same.

One optional method of conditioning the timber before treatment involves the application of steam. This may be achieved by closing all valves to the treatment plant, opening valve 2 and starting the vacuum pump 10. A vacuum of −85 kPa is achieved and held for approximately 5 minutes to remove air from the wood and treatment vessel. A steam inlet valve connected directly to a steam source is opened. Steam which can optionally be superheated is supplied under pressure to raise the temperature of the wood very rapidly. Steam times vary depending on the commodity to be treated but are typically in the range 5–80 minutes. Usually, the pressure in the cylinder will rise during this time, for example steaming at 127° C. will increase the pressure in the treatment cylinder to approximately 138 kPa. After the desired conditioning time, the inlet valve is closed and a vent valve is opened to vent the steam and equalize the pressure in the treatment vessel 8. The effect of venting the cylinder will cause expansion of steam in the wood, rendering the wood more permeable. This process can be assisted by evacuating the wood by opening valve 2 and switching on the vacuum pump 10. When steam is evacuated in this way a condenser is usually placed in the line between the pump 10 and the valve 1 to prevent condensation of steam in the vacuum pump. The surface temperature of the wood drops very rapidly and treatment temperature is below 100° C. Heating of the wood in the manner described above can substitute quite effectively for the need for wood evacuation in the Bethell treatment process. Heating of the air in the wood causes it to expand. Once impregnation of wood has been undertaken, subsequent cooling of the wood causes reduction of any residual pressure. During the steaming process, there will be condensation of steam. This condensate can be removed using the stripping pump and collecting the condensate.

EXAMPLES

The invention will now be described with reference to the following Examples. The Examples are provided for illustrative purposes only and are not to be construed as limiting the invention in any way. Each Example was or is performed in apparatus as described with reference to FIG. 1 using CCA salt (type C).

Example 1

12 pieces of Pinus radiata (D.Don) heartwood 75×38 mm were cut to lengths of 200 mm and then treated by a series of Bethell process charges with varying hydraulic pressure. The Bethell process forms the basis of vacuum pressure treatment. Each charge also included one piece of sapwood.

The waterborne preservative solution used was a CCA salt (type C). The preservative was heated to 45° C. An initial vacuum of −85 kPa was held for 15 minutes. The hydraulic pressures used were 175, 350, 700 and 1400 kPa. The pressure was varied from 60–180 minutes. The solution was withdrawn while the pressure was maintained. A final vacuum of −85 kPa was held for 15 minutes.

For charges at 350, 700 and 1400 kPa there was very little difference in heartwood penetration. The average being better than 80% of the cross-section.

After treatment, all samples were leached to check for complete fixation. The leachate showed little or no evidence of CCA.

Example 2

The results of experimental work to determine the effect of preservative temperature and treatment time in the plant is described below. In all of the runs the preservative solution was withdrawn while the vessel was pressurized to the maximum extent for that run.

12 boards of radiata pine heartwood measuring 45×20 mm in cross-section were cut and end-sealed to provide end-matched charges. These minipacks labelled C2, C5, C6 and C7 were treated by a modified Bethell process as indicated in Table 1. The modified Bethell process was selected to provide lower preservative uptake, thus avoiding excessive preservative kickback during the later stages of treatment. These minipacks were treated in an identical manner except for the preservative temperature. The temperatures were 18° C. (ambient), 30° C., 45° C. and 60° C. respectively for charges C2, C5, C6 and C7. Minipacks labelled C29, C33 and C28 were treated by the Lowry process as described in Table 1. Solution temperatures were 18° C., 33° C. and 45° C. respectively. Similar experiments were conducted using radiata pine sapwood. Minipacks S2, S5 and S6 and S7 were treated in a similar way to minipacks C2, C5, C6 and C7.

Figure 6:
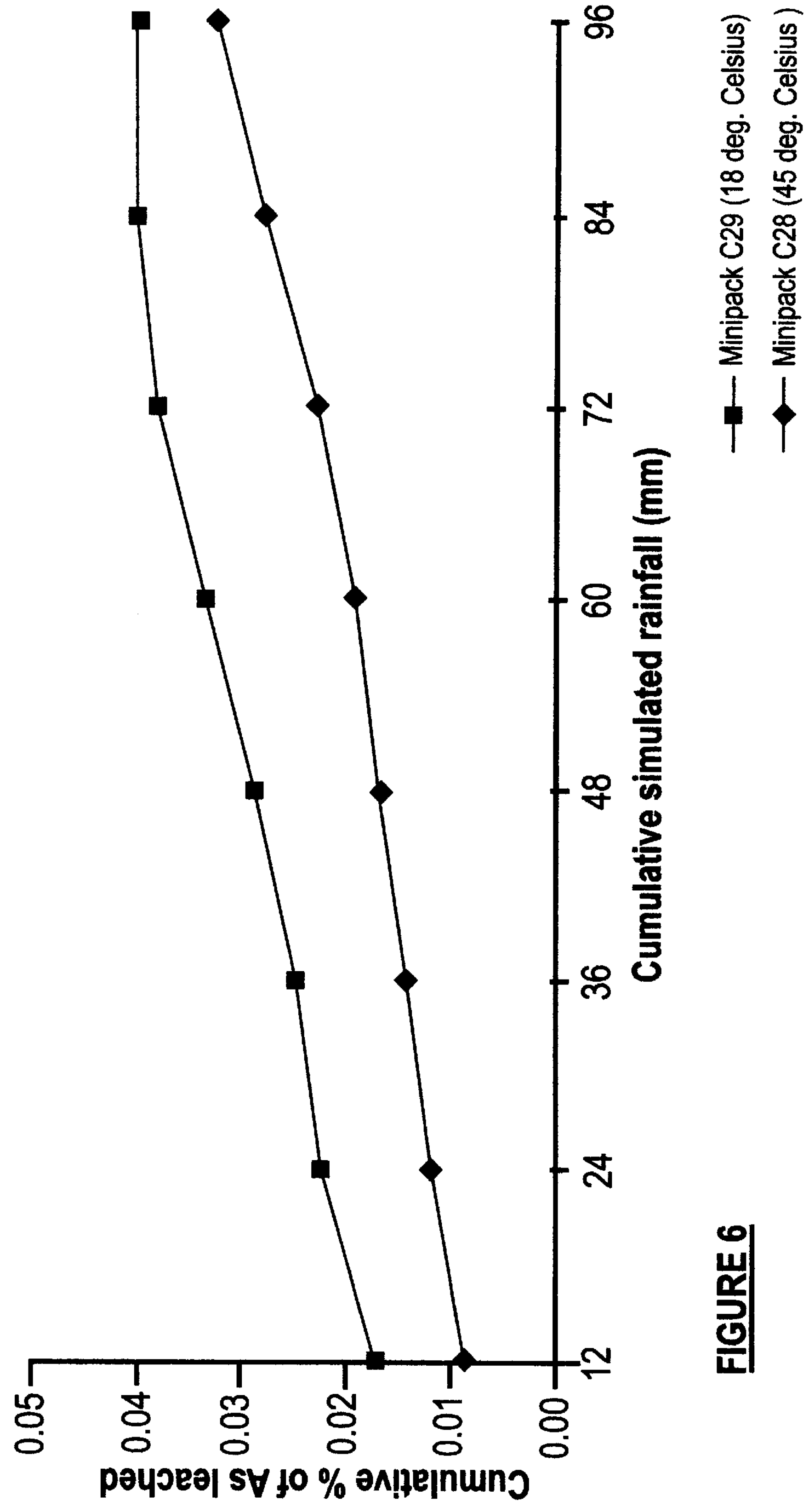
FIG. 6 is a graph showing the effect of temperature on the percentage of As leached from heartwood treated by a Lowry process.

Immediately after treatment and removal from the treatment plant, each heartwood minipack was exposed to simulated rainfall, in cycles of the equivalent of 12 mm of rain. The results are summarised in FIGS. 2–5 for copper and chromium. Levels of arsenic leachate were very low and are shown in FIG. 6 in respect of minipacks C29 and C28 only, for illustrative purposes.

TABLE 1

| Minipack code | C2 | C5 | C6 | C7 |
|---|---|---|---|---|
| Process | Mod. Bethell | Mod. Bethell | Mod. Bethell | Mod. Bethell |
| Vacuum (kPa)# | −35 (for 5 min.) | −35 (for 5 min.) | −35 (for 5 min.) | −35 (for 5 min.) |
| Pressure (kPa) | 1400 (for 90 min.) | 1400 (for 90 min.) | 1400 (for 90 min.) | 1400 (for 90 min.) |
| Vacuum (kPa) | −85 (for 15 min.) | −85 (for 15 min.) | −85 (for 15 min.) | −85 (for 15 min.) |
| Temperature (° C.) | 18 | 30 | 45 | 60 |

| Minipack code | C29 | C33 | C28 |
|---|---|---|---|
| Process | Lowry | Lowry | Lowry |
| Pressure (kPa) | 350 (for 180 min.) | 350 (for 180 min.) | 350 (for 180 min.) |
| Vacuum (kPa) | −85 (for 60 min.) | −85 (for 60 min.) | −85 (for 60 min.) |
| Temperature (° C.) | 18 | 33 | 45 |

Note:
#The initial vacuum was drawn over 2 minutes

Figure 7:
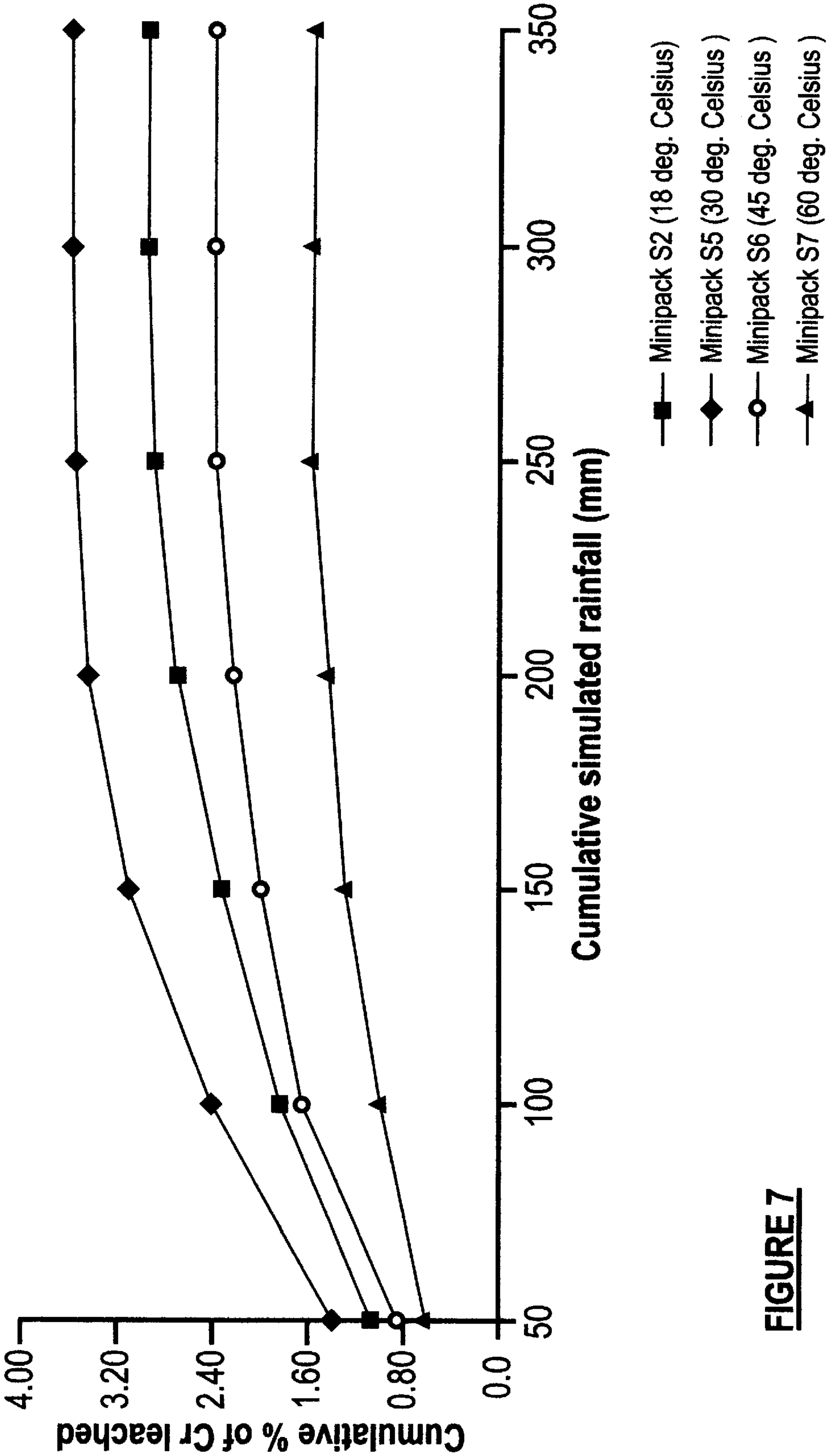
FIG. 7 is a graph showing the effect of temperature on the percentage of Cr leached from sapwood treated by a modified Bethell process.
Figure 8:
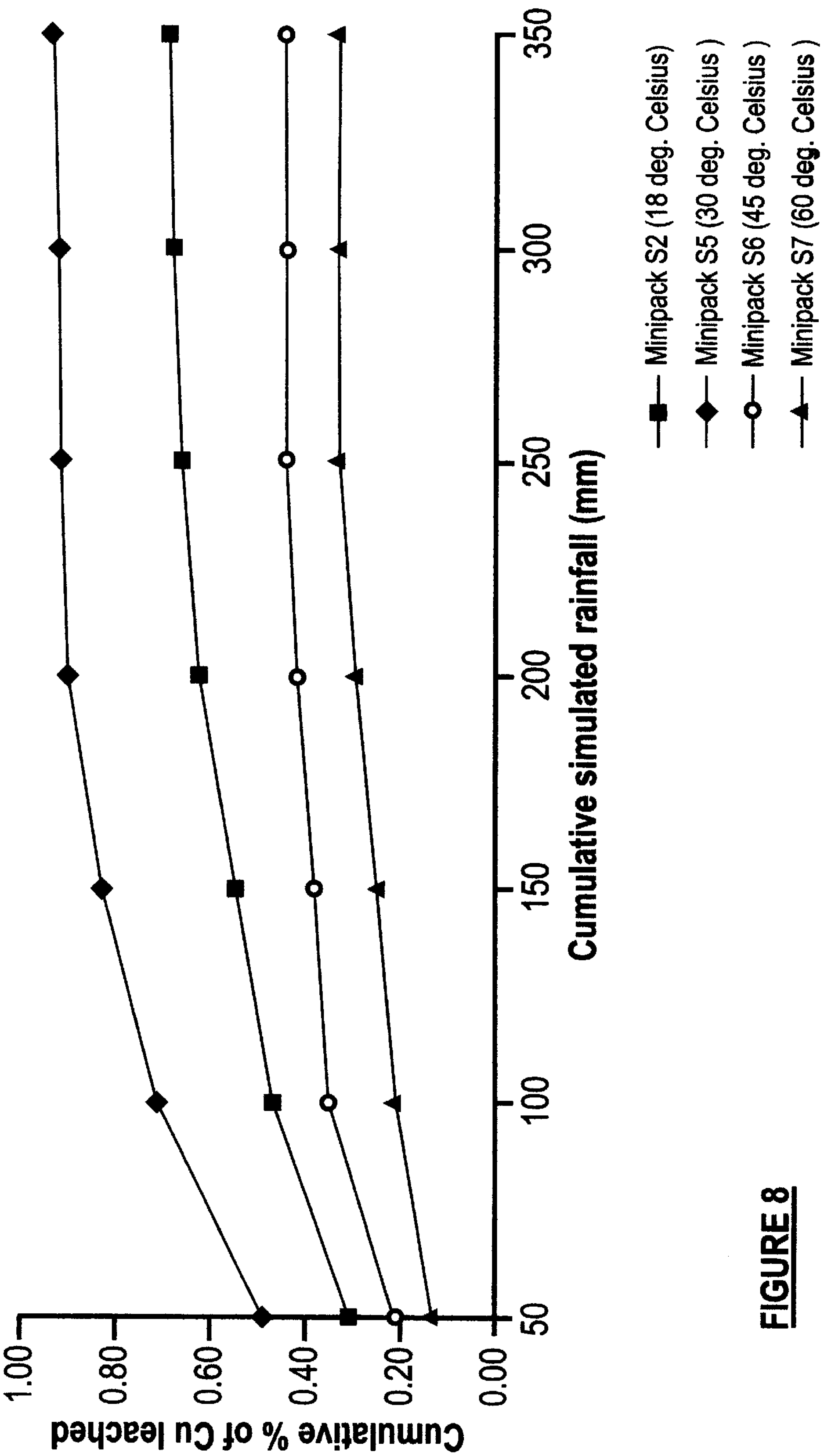
FIG. 8 is a graph showing the effect of temperature on the percentage of Cu leached from sapwood treated by a modified Bethell process.

The sapwood packs were each exposed to simulated rainfall in 50 mm equivalent intervals. The results are summarized in FIGS. 7 and 8 for copper and chromium.

These experiments indicate a marked improvement in preservative fixation as the preservative temperature is increased. Details of the simulated rainfall testing procedure are given by Wally, S., Cobham, P., and Vinden, P. (1996) together with comparisons of other testing methodology.

It should be noted that these experiments were conducted to provide data on preservative fixation as a function of temperature and should not be construed as the optimum treatment schedule.

Example 3

An example of ultra low pressure treatment involves the treatment of predominantly sapwood of pine whereby the timber is evacuated in the cylinder to between −35 and −85 kPa for approximately 5 to 10 minutes; the evacuated treatment cylinder is flooded with preservative solution and is then pressurized to approximately 150 kPa. After approximately 30 minutes −1 hour the treatment cylinder is emptied of preservative by pressuring the treatment cylinder with compressed air at approximately 150 kPa. This air pressure maintains the wood pressure while the treatment cylinder is being emptied and thus prevents premature kickback. This air pressure is maintained for a further 2 hours to improve preservative penetration in any heartwood; to prevent any premature kickback of preservative and wood sugars which would cause sludging; to maximise the fixation reactions between the preservative and wood prior to kickback; and to minimise or even eliminate kickback of solution. Kickback is minimal because of the low pressures utilised for treatment, and the holding period under pressure. A final vacuum may be employed to ensure that the surfaces of the wood are completely dry. If this final vacuum is applied, a scavenger of stripping pump may be utilised to remove kickback solution whilst the timber is under vacuum.

This kickback solution can be processed using a number of standard procedures—for example treating with peroxide solution to destroy organic material, or reverse osmosis.

The treatment schedule described above will be varied depending on the size of the commodity, and the specification requirements, relating to heartwood treatment and the condition of the timber—whether it has been high temperature dried or steam conditioned prior to treatment to improve its permeability. However, the principals adopted include minimising the contact time between the parent preservative solution and the wood during flooding and pressure impregnation, minimising preservative absorption consistent with the constraints associated with total sapwood penetration, maintaining the heated preservative in the wood under air pressure to achieve maximum fixation of preservative; minimising any kickback of preservative solution; removing any kickback and keeping it segregated from the parent solution until organic materials have been removed. The contact time between the preservative and wood will reduce for timber commodities which have been high temperature dried, but ideally conditioned before treatment.

Example 4

A charge of dried timber (approximately 12% moisture content) is steam conditioned at 127° C. for 10 minutes in the treatment cylinder, vented and then evacuated to −35 kPa for 5 minutes. The evacuated treatment cylinder is then flooded with hot CCA preservative (at 40° C.) and the pressure is raised to 150 kPa and held until the sapwood has attained a gross uptake of 450 $l/m^3$. This takes approximately 15–30 minutes after which air pressure (150 kPa) (eg from the outlet of the vacuum pump which acts as a pressure pump) is applied to the treatment vessel to blow back the CCA preservative into a storage vessel while maintaining the timber at the same pressure as the treatment pressure. The timber is maintained at this pressure for a further 2½ hours to achieve preservative fixation and improved penetration into heartwood. The pressure is then released and evacuated to −85 kPa to allow kickback. As the kickback solution is drawn out of the wood, a scavenger pump or stripping pump (which operates under vacuum) withdraws kickback solution from the treatment vessel and returns it to a separate storage vessel to keep it apart from the parent solution. The kickback solution is processed to remove contaminants eg by adding peroxide and the clean solution is returned to the parent solution. Gross charge uptake before kickback is typically 450 $l/m^3$ and the kickback is typically 200 $l/m^3$, thus providing a net charge uptake of 250 $l/m^3$. The timber is surface dry to touch and the preservative is effectively fixed in the wood.

Example 5

Example of improved preservative penetration as a result of steam conditioning of dry timber before preservative treatment.

A comparison of the percentage preservative penetration in 100×50 mm air-dried radiata pine heartwood following steam conditioning as described in Example 4 is illustrated in Table 2. The results indicate that 85% penetration of heartwood can be achieved after 1 minute of pressure at 1400 kPa if the samples are steamed before treatment. This is higher than the minimum penetration required for heartwood samples in Australia and New Zealand. These results compare with 74% penetration in heartwood samples which were air dried and received no steam conditioning, but pressure impregnated at 1400 kPa for 180 minutes.

There was an improvement in preservative penetration of heartwood if treatment times were extended for the steamed material from 1 minute to 60 minutes for example about 100% penetration of heartwood was recorded after 60 minutes of pressure impregnation. The results also indicate that treatment pressure can be reduced following steam conditioning whilst still maintaining a relatively high standard of treatment. For example timber treated at 350 kPa for 60 minutes achieved 85% penetration. The results from this work also indicated that for both sapwood and heartwood total penetration of the timber is possible without the need for totally saturating the timber with wood preservative.

TABLE 2

Comparison of % Preservative penetration in air-dried heartwood following modified Bethell treatment

| | Charge 1 Steamed Treatment (1400 kPa 1 min) | Charge 2 Steamed Treatment (1400 kPa 60 mins) | Charge 3 Steamed Treatment (350 kPa 60 mins) | Charge 4 Steamed Treatment (1400 kPa 180 mins) |
|---|---|---|---|---|
| Preservative Penetration | 85 | 99 | 83 | 74 |
| Standard Deviation | 26 | 3 | 26 | 25 |
| Coefficient of Variation % | 31 | 3 | 31 | 34 |

Example 6

Figure 9:
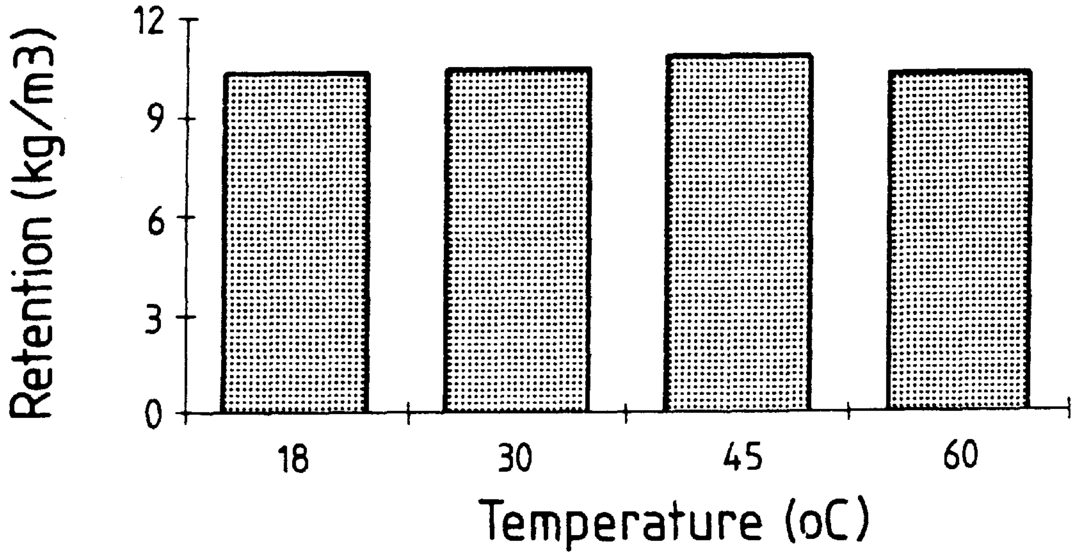
FIG. 9 is a graph showing preservative retention achieved in heartwood minipacks treated by a modified Bethell process as a function of temperature.
Figure 10:
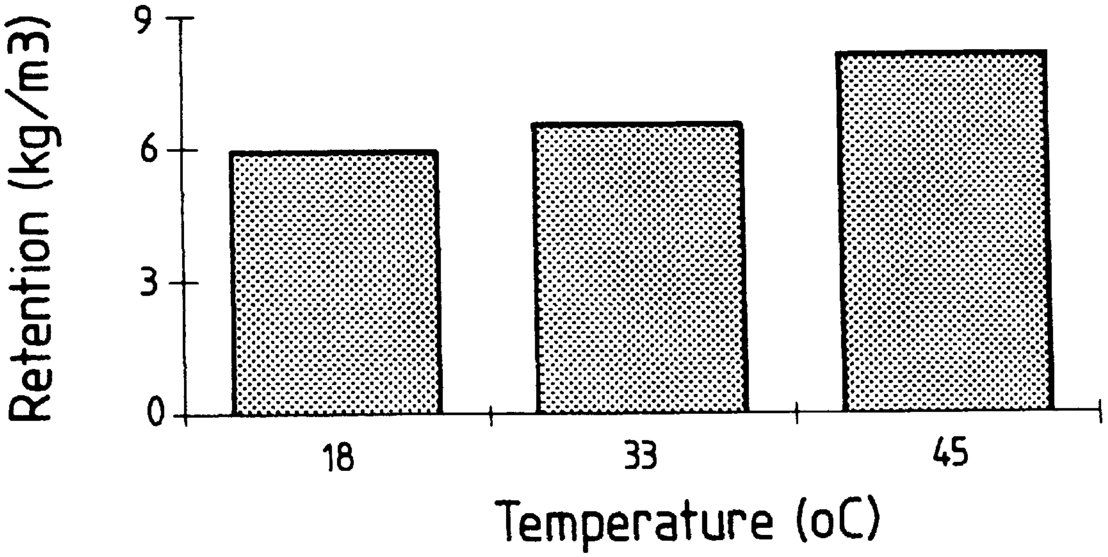
FIG. 10 is a graph showing preservative retention achieved in heartwood minipacks treated by a Lowry process as a function of temperature.

The application of hot CCA can also improve the permeability of radiata pine heartwood. FIG. 9 illustrates no improvements for a modified Bethell treatment when temperature is increased from ambient (18° C.) to 60° C. and the treatment is conducted for 90 minutes on pressure. However, as seen in FIG. 10, when the treatments use a Lowry schedule and treatment time under pressure is increased to 180 minutes, there is an increase in preservative penetration of heartwood. This is thought to be due to the action of heat in mobilising resins following the longer heat exposure of 3 hours.

The following Examples illustrate the impregnation of waterborne preservative treated wood with hot oil.

Example 7

Laboratory Scale

Procedure

A laboratory scale trial was carried out to investigate the use of Prorex 130 oil and the level of fixation which could be achieved. Mini-packs of sapwood were prepared and treated with a 2.00% CCA oxide solution.

The CCA treatment cycle involved an initial vacuum of −35 kPa held for 5 minutes. The cylinder was then flooded with 2% CCA at 45° C. The pressure was increased to 700 kPa and held there for 60 minutes, followed by emptying, kickback and a final vacuum of −85 kPa which was held for 15 minutes.

As soon as the CCA treatment was complete, the wood was transferred to a similar smaller pressure vessel for the Prorex 130 oil treatment. The oil treatment involved an initial vacuum of −50 kPa held for 15 minutes. The oil was then drawn into the cylinder at 8520 C. A liquid pressure of 700 kPa was then applied and held for 60 minutes. The oil was drained from the cylinder. The oil temperature was now 36° C. and a final vacuum of −85 kPa was drawn and held for 15 minutes.

The temperature decreased during the oil treatment because there was no way of maintaining the temperature.

After the oil treatment was complete, the wood was allowed to sit for 3 hours then shower tested with distilled water equivalent to 50 mm of rain over 1 hour.

Results (a) Weight Gain

The weight gain achieved during CCA treatment was 50.5% and penetration tests indicated complete penetration of CCA in the sapwood.

The weight gain as a result of the oil treatment was 21.6% which is equivalent to 166 liters of oil per cubic meter. Water repellency tests showed that there was complete penetration of the oil.

(b) Shower Test

Analysis of the wash off water from the CCA-oil treated wood showed 4.03 mg/l (milligrams per liter) of hexavalent chrome present. 5 mg/l has been accepted as an acceptable level of hexavalent chrome in run off rain water in the United States of America so that it is not considered hazardous waste.

Previous trials with sapwood treated by a similar process using ambient temperature CCA and in oil treatment have shown rain wash off figures of greater than 72 mg/l of hexavalent chromium. Up to 6 days at ambient temperature storage are required for the wash off level to drop below 5 mg/l.

(c) Appearance

The sapwood samples directly out of the cylinder were a dark brown colour with a slight green tinge. The colour lightened on drying. Showering with water showed water repellency with the water beading on the surface.

Example 8

The first part of the process uses a low initial vacuum (−35 kPa for 5 minutes) on the timber in the pressure cylinder followed by flooding with CCA and pressure to 350 kPa for 15 minutes. This is followed by emptying the cylinder, kickback and a final vacuum of −85 kPa for 30 minutes. This is followed by a heated oil (85° C.) treatment. The timber is under vacuum (−80 to −85 kPa) from the previous CCA treatment. The cylinder is flooded with hot oil and the pressure is raised to 1000 kPa for 30 minutes. The cylinder is drained and a final vacuum applied at −85 kPa for 30 minutes.

This schedule provides total CCA penetration of sapwood of radiata pine, total penetration of the oil preservative and total, rapid fixation of the CCA. CCA preservative net uptake is approximately 250–300 l/$m^3$. The oil net absorption ranges from 30–50 l/$m^3$.

Example 9

Commercial Scale

Procedure

Air dried posts, 6 bundles, were tested for moisture content to ensure that they were below fibre saturation (<25%).

The posts were treated with CCA oxide by a modified Bethell process. Bundles of posts were weighed before and after CCA treatment and then after creosote treatment.

| | |
|---|---|
| (a) Treatment Cycle (CCA) | |
| Initial vacuum | −35 kPa held for 5 minutes |
| Flood | maintaining −35 kPa |
| Hydraulic pressure | 700 kPa held for 45 minutes |
| Ramp down pressure | 700 to 0 kPa over 10 minutes |
| Drain Cylinder | |
| Final vacuum | −85 kPa held for 45 minutes |
| (b) Treatment Cycle (Creosote) | |
| Initial vacuum | −80 kPa held for 20 minutes |
| Flood | vacuum ranged from −50 to −70 kPa |
| Hydraulic pressure | 750 kPa held for 30 minutes |
| Drain Cylinder | |
| Final vacuum | −80 kPa held for 15 minutes |

The temperature of the creosote for this trial was 85° C.

Results

The treatment trials were carried out as described above. The post size was 1.8 meters long and 100 to 125 mm diameter posts. The weight gains for the CCA treatment are shown in Table 3 below.

TABLE 3

| Weight Before | Weight After | Weight Gain | l/$m^3$ |
|---|---|---|---|
| 760 | 1160 | 400 | 357 |
| 760 | 1180 | 420 | 375 |
| 760 | 1160 | 400 | 357 |

The charge sheet showed an uptake of 320 l/$m^3$. Borings were taken from posts at random and they showed complete sapwood penetration.

As soon as the charge was unloaded it was transferred to the creosote plant, loaded and treated to the above schedule. The weight gains are shown in Table 4 below. The creosote specific gravity at 85° C. was considered to be 1.025. The charge sheet showed an uptake of 208 l/$m^3$. The industry aim is for an uptake of 128 l/$m^3$ when treating with creosote.

TABLE 4

| Weight Before | Weight After | Weight Gain | l/$m^3$ |
|---|---|---|---|
| 1160 | 1280 | 120 | 110 |
| 1180 | 1220 | 140 | 128 |
| 1160 | 1300 | 140 | 128 |

Again borings were removed from the posts and all showed complete sapwood penetration of creosote.

The CCA in the posts appeared to be completely fixed and there was no evidence of water having been forced out of the wood from residual internal pressure. Complete fixation can be expected when CCA treated wood has been heated at 85° C. for 70 minutes and the fact that the heated oil had penetrated the wood. There was some creosote drip from the posts, but this was due to the relatively short final vacuum applied.

The appearance of the posts was as if they had been treated by creosote alone. There was little evidence of the normal CCA green colour.

This example shows that while creosote presents environmental difficulties, its use may advantageously be combined with waterborne preservatives in a treatment process which alleviates many of the difficulties. In particular smaller quantities of creosote may be used with improved penetration.

Figure 11:
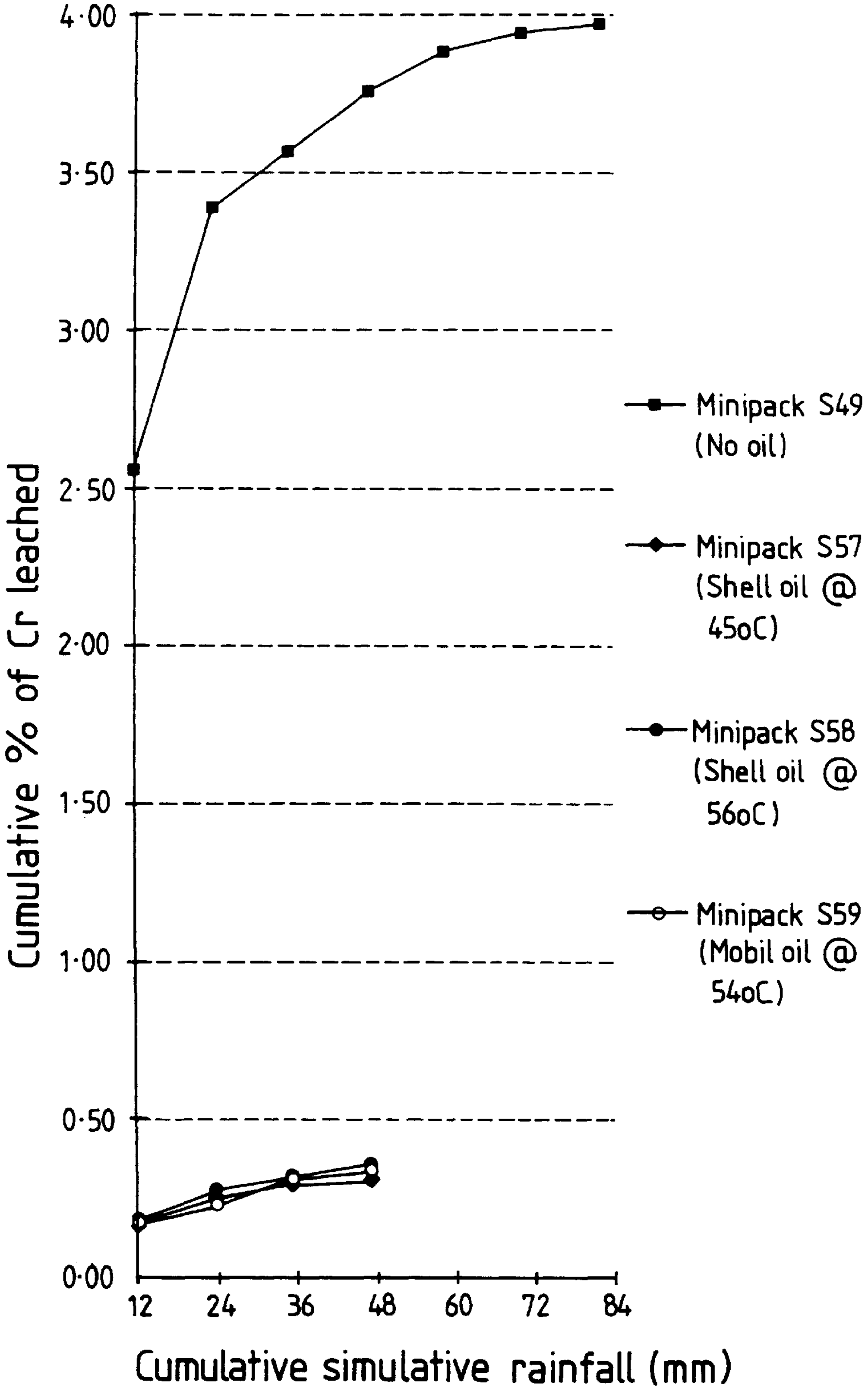
FIG. 11 is a graph showing the effect of oil on the percentage of Cr leached from Lowry treated sapwood.

FIG. 11 illustrates the dramatic improvement in the percentage of Cr leached from Lowry treated sapwood when the treated sapwood is subjected to oil impregnation under pressure at temperatures ranging from 45 to 56° C. The oil impregnation is performed as previously described.

Throughout this specification and the claims which follow, unless the context requires otherwise, the word "comprise", or variations such as "comprises" or "comprising", will be understood to imply the inclusion of a stated integer or group of integers but not the exclusion of any other integer or group of integers.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

What is claimed is:

1. A process for treating wood with waterborne preservative, comprising the following steps:

introducing wood to be treated into a treatment vessel;

pretreating said wood by application of at least one of (a) an initial vacuum, and (b) a pressure not exceeding 150 kPa;

immersing said wood in said treatment vessel in a waterborne preservative preheated to a temperature of about 40° C. to about 90° C., at elevated pressure and at elevated temperature ranging from at least 40° C. to less than 100° C. so as to impregnate said wood with said preservative and to facilitate fixation of said preservative in said wood in a single step;

separating impregnated said wood and any excess waterborne preservative while said treatment vessel is pressurized; and reducing pressure in said treatment vessel.

2. The process of claim 1, further including segregating kickback from treated said wood after at least one of a step of separating and a step of reducing.

3. The process of claim 1, further including selecting said preservative from a group consisting of a preservative comprising (i) CCA, (ii) an oxide of CCA, and (iii) a salt of CCA.

4. The process of claim 1, including preheating said preservative to a temperature of about 90° C.

5. The process of claim 1, including preheating said preservative to a temperature of about 40° C.

6. The process of claim 1, further including preheating said wood.

7. The process of claim 6, wherein said preheating comprises steaming said wood.

8. The process of claim 7, wherein said steaming is applied to pre-evacuated dry timber.

9. The process of claim 8, wherein pre-evacuation and steaming are performed in said treatment vessel.

10. The process of claim 8, wherein pre-evacuation and steaming are performed over a time period ranging from about ten minutes to about eighty minutes.

11. The process of claim 1, wherein said treatment vessel and wood therein are evacuated prior to immersing said wood in said waterborne preservative.

12. The process of claim 10, wherein said treatment vessel and wood therein are evacuated with a vacuum of from 0 kPa to −98 kPa prior to immersion of said wood in said waterborne preservative.

13. The process of claim 10, wherein vacuum is maintained while said wood is immersed in said waterborne preservative.

14. The process of claim 1, wherein immersed said wood in said treatment vessel is subjected to a maximum pressure of about 350 kPa.

15. The process of claim 14, wherein immersed said wood in said treatment vessel is subjected to a maximum pressure of about 150 kPa.

16. The process of claim 1, wherein separation of said wood from said waterborne preservative is performed by removing said wood from said preservative.

17. The process of claim 1, wherein separation of said wood from said waterborne preservative is performed by removing said waterborne preservative from said treatment vessel.

18. The process of claim 17, wherein removing said water-borne preservative is performed by blowing, at a pressure at least equal to treatment pressure, said waterborne preservative into a storage vessel.

19. The process of claim 1, wherein following a step of reducing said pressure, said wood is subjected to a vacuum.

20. The process of claim 1, wherein gross uptake of said preservative into said wood does not exceed 450 $l/m^3$.

21. The process of claim 1, further including subjecting said wood to oil impregnation at a process step selected from a group consisting of (i) before impregnation of said waterborne preservative, and (ii) after impregnation of said waterborne preservative.

22. The process of claim 21, wherein during impregnation said oil is at elevated temperature and is under pressure.

23. The process of claim 21, wherein net oil absorption ranges from about 25 $l/m^3$ to about 100 $l/m^3$.

24. The process of claim 23, wherein net oil absorption ranges from about 30 $l/m^3$ to about 50 $l/m^3$.

25. The process of claim 21, wherein said oil is impregnated at a temperature ranging from above ambient to about 90° C.

26. The process of claim 25, wherein said oil is impregnated at a temperature ranging from about 40° C. to about 80° C.

27. The process of claim 25, wherein said oil is impregnated after impregnation of said waterborne preservative.

28. The process of claim 27, wherein oil impregnation is performed at a pressure ranging from about 700 Kpa to about 1,000 Kpa.

29. The process of claim 27, wherein said wood is evacuated after waterborne preservative impregnation and before oil impregnation.

30. The process of claim 27, wherein said wood is evacuated after oil impregnation.

31. Wood treated with waterborne preservative according to the process of claim 1.

32. A process for treating wood with preservative, comprising the following steps:

introducing wood to be treated into a treatment vessel;

pretreating said wood by applying an initial vacuum to said wood;

immersing said wood in said treatment vessel in a waterborne preservative at elevated pressure at a pressure and for a time to facilitate impregnation of said wood with said preservative without permitting said wood to saturate with said preservative;

separating impregnated said wood and excess waterborne preservative; and subsequently impregnating said wood with heated oil under pressure, in which said impregnation of said wood with said waterborne preservative at a pressure and for a time insufficient to saturate said wood with said preservative facilitates impregnation of said wood with said oil across substantially an entire cross-section of said wood, said oil facilitating fixation of said preservative in said wood.

33. The process of claim 32, wherein net oil absorption ranges from about 25 $l/m^3$ to about 100 $l/m^3$.

34. The process of claim 33, wherein net oil absorption ranges from about 30 $l/m^3$ to about 50 $l/m^3$.

35. The process of claim 32, wherein said oil is impregnated at a temperature ranging from above ambient to about 90° C.

36. The process of claim 35, wherein said oil is impregnated at a temperature ranging from about 40° C. to about 80° C.

37. The process of claim 32, wherein oil impregnation is performed at a pressure ranging from about 700 kPa to about 1,000 kPa.

38. The process of claim 32, wherein said wood is evacuated after waterborne preservative impregnation and before oil impregnation.

39. The process of claim 32, wherein said wood is evacuated after oil impregnation.

40. The process of claim 32, wherein said waterborne preservative is selected from a group consisting of (i) CCA, (ii) an oxide of CCA, and (iii) a salt of CCA.

41. The process of claim 32, wherein said oil includes at least one additive.

42. Wood treated with preservative according to the process of claim 32.

* * * * *

UNITED STATES PATENT AND TRADEMARK OFFICE

CERTIFICATE OF CORRECTION

PATENT NO. : 6,235,403 B1 | Page 1 of 1
APPLICATION NO. : 08/952132
DATED : May 22, 2001
INVENTOR(S) : Vinden et al.

It is certified that error appears in the above-identified patent and that said Letters Patent is hereby corrected as shown below:

ON THE COVER:
(73) Assignees: Chemica Limited should read Chemicca Limited.

Signed and Sealed this

Twenty-ninth Day of August, 2006

JON W. DUDAS
*Director of the United States Patent and Trademark Office*